R. M. UHLMANN.
MACHINE FOR CUTTING SKEW BEVEL GEARS.
APPLICATION FILED FEB. 11, 1913. RENEWED FEB. 1, 1916.
1,202,456.
Patented Oct. 24, 1916.
5 SHEETS—SHEET 3.
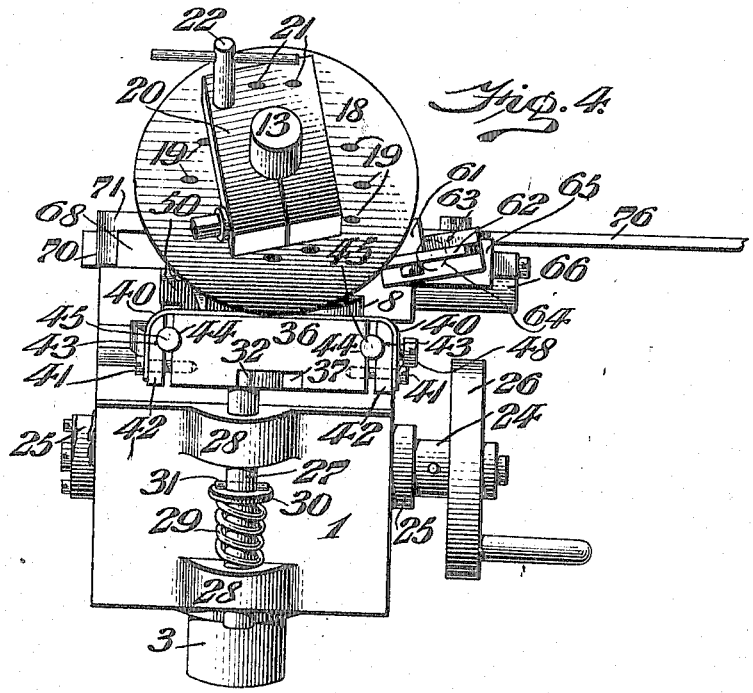
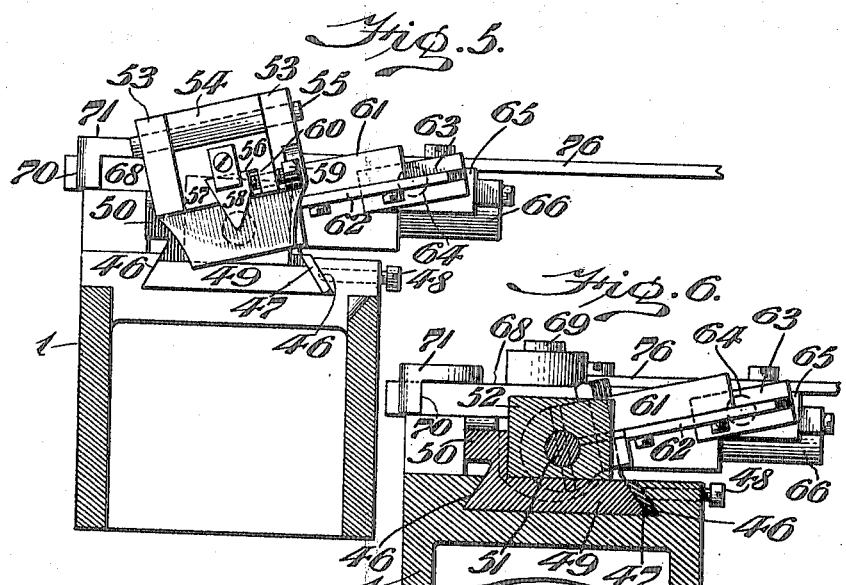
WITNESSES
INVENTOR
Richard Max Uhlmann
BY
Wiedersheim & Fairbank
ATTORNEYS

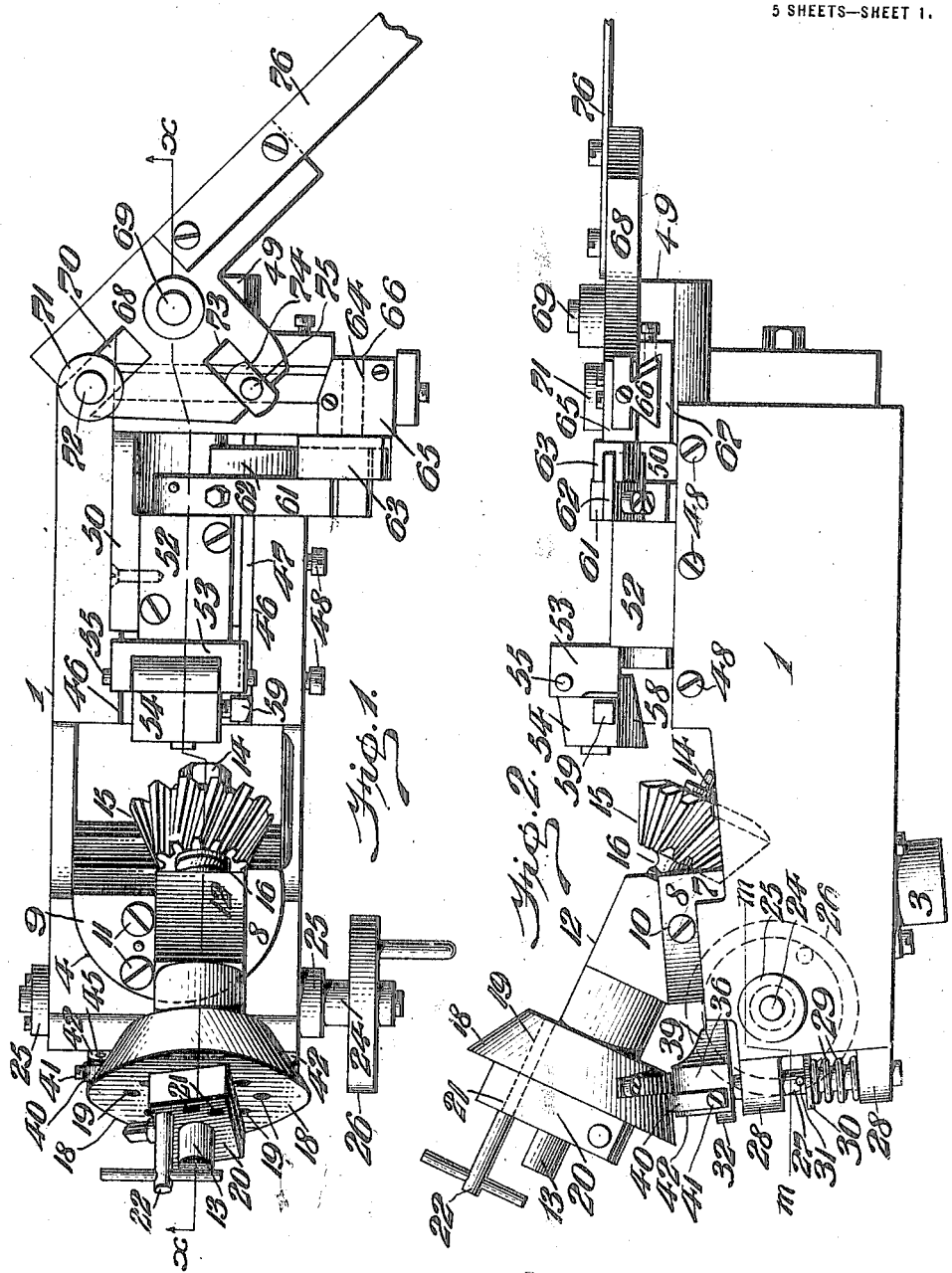

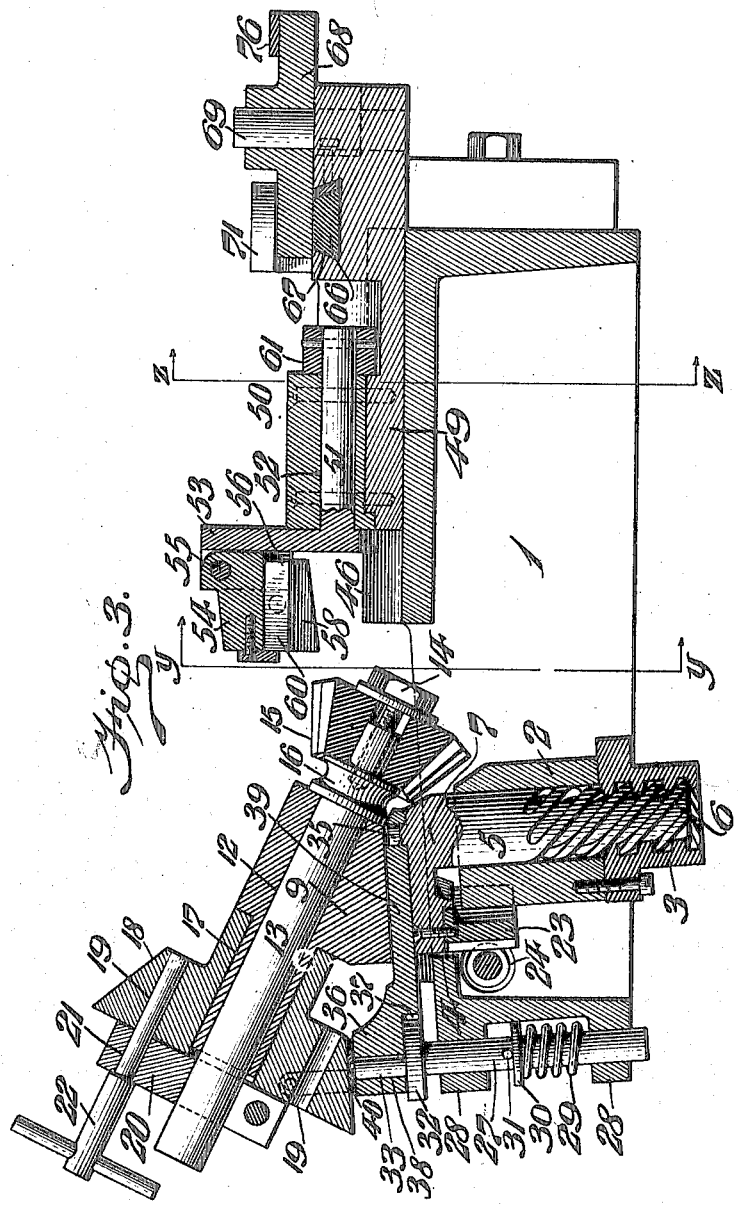

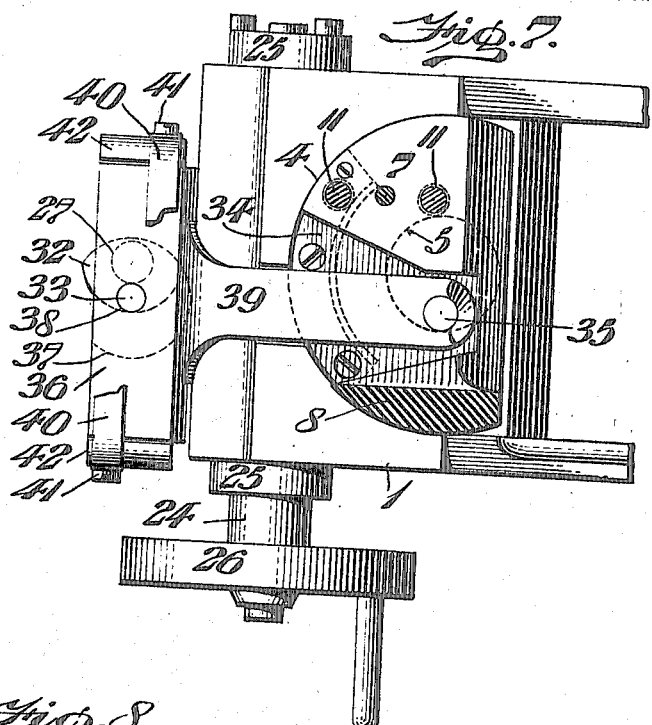
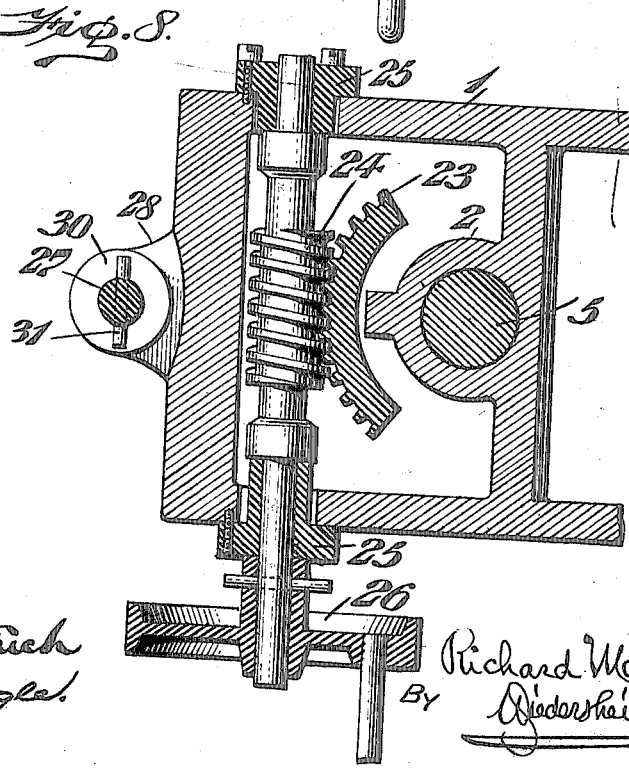

R. M. UHLMANN.
MACHINE FOR CUTTING SKEW BEVEL GEARS.
APPLICATION FILED FEB. 11, 1913. RENEWED FEB. 1, 1916.
1,202,456.
Patented Oct. 24, 1916.
5 SHEETS—SHEET 5.
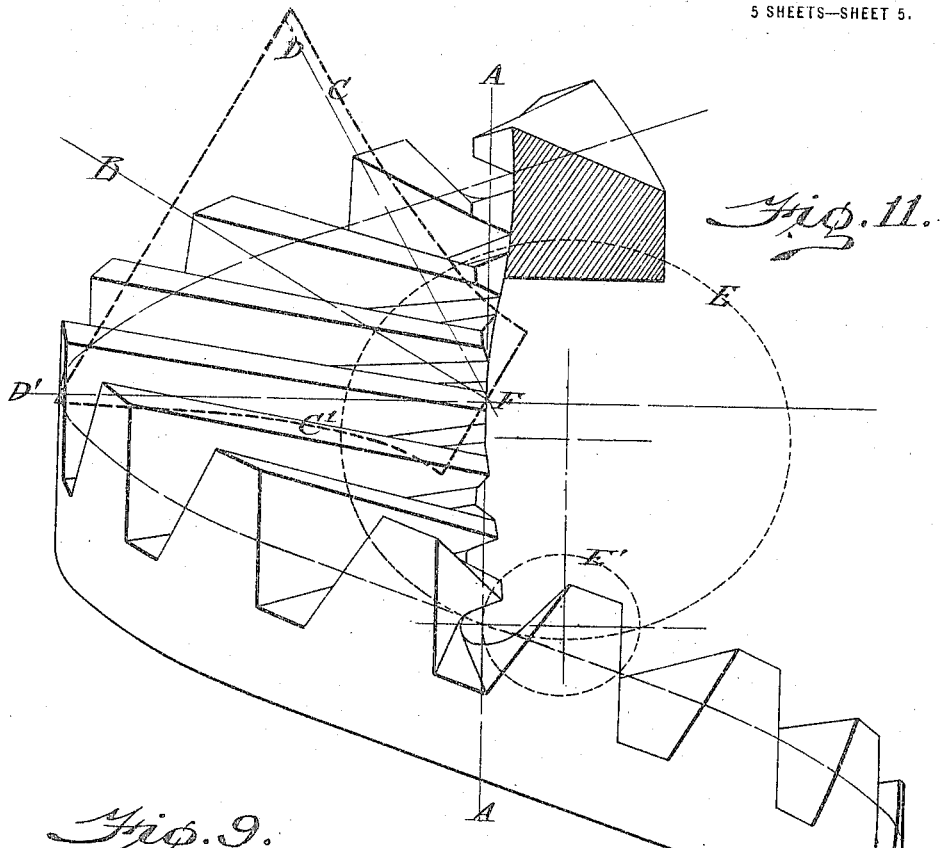
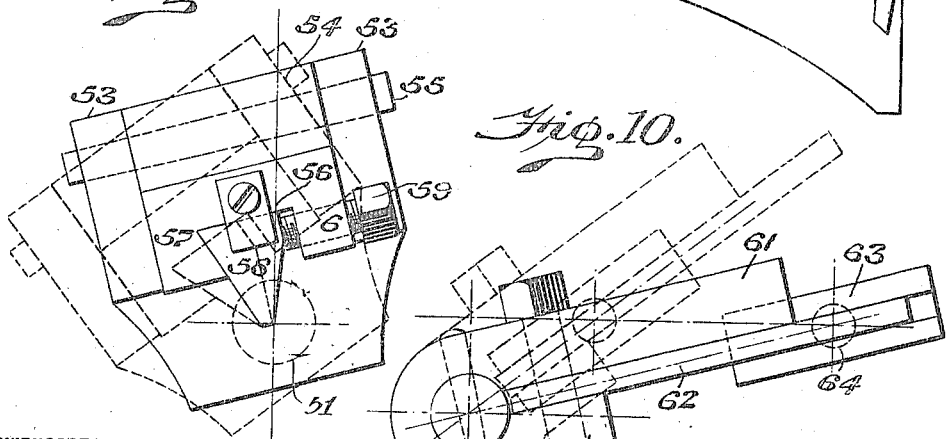
WITNESSES
INVENTOR
Richard Max Uhlmann,
Diederheim & Fairbanks
ATTORNEYS ated Oct. 24, 1916.

UNITED STATES PATENT OFFICE.

RICHARD MAX UHLMANN, OF PHILADELPHIA, PENNSYLVANIA.

MACHINE FOR CUTTING SKEW BEVEL-GEARS.

1,202,456.

Specification of Letters Patent.

Patented Oct. 24, 1916.

Application filed February 11, 1913, Serial No. 747,716. Renewed February 1, 1916. Serial No. 75,622.

*To all whom it may concern:*

Be it known that I, RICHARD MAX UHLMANN, a citizen of the United States, residing in the city and county of Philadelphia, State of Pennsylvania, have invented a new and useful Machine for Cutting Skew Bevel-Gears, of which the following is a specification.

My invention consists of a machine for cutting skew bevel gears in a theoretically correct manner, in which the blank and a tool with straight cutting edges receive such motions in relation to each other, that the shape of tooth is formed by the process of generation.

Skew bevel gears cut heretofore were at best only approximations, which in most cases were used as patterns for producing gears, the teeth of which were merely cast. With this new machine, skew bevel gears can be cut that are as nearly perfect as other simpler types of gears used in high-grade machinery.

The machine is based on the following theory:—Just as the method now generally adopted for generating bevel gears is based on a circular rack, usually called a crown wheel, the sides of the teeth of which are plane surfaces, so the method for generating skew bevel gears embodied in my machine is similarly based on a rack, which, however, is not circular, but helicoidal. The sides of any normal tooth section of this rack are straight lines like in the case of the crown wheel, but the tooth surfaces are twisted, as appears from Figure 11. Therefore correct tooth surfaces of skew bevel gears will be generated if identically the same motions are imparted to a blank, which the gear would have to make when being rolled back and forth on the helicoidal rack, with the teeth in mesh, while at the same time, the straight cutting edge of some tool, as it advances, changes its angular position by swinging laterally around a line, preferably parallel to the stroke, in such a way as to sweep out the twisted tooth surface of the imaginary helicoidal rack.

The annexed drawing and the following description set forth in detail one mechanical form embodying the invention, such detail construction being but one of the various forms in which the principle of the invention may be used.

In the said annexed drawings, Fig. 1 represents a top view of the machine for generating skew bevel gears. Fig. 2 represents a side elevation of the machine. Fig. 3 represents a longitudinal vertical section on the line x—x in Fig. 1. Fig. 4 represents an end view of the machine. Fig. 5 represents a transverse section on the line y—y in Fig. 3. Fig. 6 represents a transverse section on the line z—z in Fig. 3. Fig. 7 represents a plan view of one end of the machine, with the arbor, its bearing and the cone removed. Fig. 8 represents a horizontal section on line m—m in Fig. 2. Fig. 9 represents a front view of the shaper head, one position being indicated in full lines and one in dotted lines. Fig. 10 represents the device for imparting to the shaper head a variable motion. Fig. 11 represents the imaginary helicoidal rack.

Similar numerals of reference indicate corresponding parts in the figures.

Referring to the drawings, the reference numeral 1 indicates the bed of the machine which bed has a bearing, 2, not quite vertical, its inclination corresponding to the decrement of the gear to be cut. An internally threaded collar, 3, is secured to the lower end of said bearing to form a continuation of the same. A semicircular recess, 4, is formed in the top of the bed concentric with said bearing. In this bearing, 2, a shaft, 5, is fitted to turn, the lower portion, 6, of which has steep threads of a lead corresponding to that of the imaginary helicoidal rack. The upper end of said shaft is substantially a turret fitting in the semicircular recess of the bed. One side of this turret has a vertical extension forming a shoulder, 8. A bearing block, 9, is secured to it by a screw, 10, and otherwise secured to the turret by the screws, 11. In the bearing, 12 in the bearing block 9, the mandrel, 13, is journaled askew with the shaft 5, the axes passing each other at a distance equal to the gorge radius of the gear to be cut. On the mandrel the gear blank, 15, is clamped by a screw, 14, against a collar 16, said collar being in one piece with the mandrel. The upper end of the bearing 12 is reduced to a sleeve, 17, upon which a truncated cone, 18, is journaled. The angle of the cone as also the inclination of the mandrel correspond to the skew angle of the gear to be cut. In the cone are the index holes, 19, corresponding in number to the number of teeth to be cut in the gear. An index arm, 20, with three index holes, 21, is secured to the upper end of the mandrel by a tangent screw.

The numeral 22 indicates the index pin.

To the under side of the turret 7 is secured a spiral gear sector, 23, which engages with a worm, 24, and which worm is journaled in bearings, 25, fastened to the sides of the bed. On the end of the worm spindle is a hand wheel, 26, for operating the feed. A shaft, 27, is slidably and revolubly supported in bearings, 28, at the end of the bed and is gently pressed upward by a coiled spring, 29, bearing against the lower bearing and against a washer, 30, held between the spring and a pin, 31, upon said shaft. Said bearings and the shaft 27 therein are parallel with the bearing 2 and the shaft 5 in the same and both are in the same longitudinal vertical plane. The shaft 27 has at the upper end a collar, 32, and on top of it a crank pin, 33. A recess, 34, is formed in the upper face of the turret 7, in which there is another crank pin, 35. The eccentricity of each of these pins is equal to the gorge radius of the gear to be cut. A bar, 36, with a pocket, 37, in the under side to afford space for the collar 32, is mounted on the crank pins 33 and 35 by its bore, 38, and another bore in the end of its arm, 39. Two flexible steel bands, 40, are each secured with one end to the circumferential surface of the cone and with the other end by the screws, 41, to the bar 36. The intermediate plates, 42, over the rounded part of which the steel bands are stretched act as levers, for which the pins, 45, held in position by the semicircular grooves 43 and 44 are the fulcrums, and thus afford with the aid of the screws 41 some convenient means for adjusting the tension of the steel bands.

If now the hand wheel 26 is turned, the worm 24 will act on the spiral gear sector 23 and thus turn the shaft 5, which by virtue of its threaded portion 6 will at the same time move along its axis, that is, either up or down, according to the way the hand wheel is turned, either right or left hand. As the shaft 5 turns, the mandrel 13 with the gear blank 15 is bound to swing sidewise. The cone 18 will also swing sidewise, but the flexible steel bands 40 holding it on the under side, it is compelled to turn at the same time on its axis, and it being coupled by index pin 22 and index arm 20 to the mandrel 13, this rotary motion is transmitted to the gear blank. In the upward movement of the entire structure carried by the turret 7 of shaft 5, the bar 36, which overhangs, is assisted by the coiled spring 29. The bearing 9 being askew with shaft 5, the mandrel with the gear blank and also the cone will swing eccentrically; therefore, the bar 36 on the ends of which the flexible steel bands 40 are held must make some compensatory movement, which it receives through the crank pin 35. The resultant of the three elementary motions thus imparted to the gear blank, viz., rectilinearly up and down, swinging sidewise and rotating on its axis, together with the aforesaid compensatory motion, is identical with that of a skew bevel gear when being rolled back and forth, while in mesh with a helicoidal rack.

The remaining part of the machine is the tool operating mechanism.

The top of the bed has a longitudinal, dovetail groove 46, in which there is a gib 47 adjustable by means of screws 48. The ram 49 fits slidably in this groove and has on its farther side a shoulder, 50, (see Fig. 1). A bearing, 52, is fastened to the upper side of the ram and also against the shoulder. A shaft, 51, is journaled in this bearing, preferably parallel to the ram, but out of line with the mandrel 13, that is, askew to the gear to be cut. This shaft has on the inner end a shaper head, 53, in which an apron, 54, is pivoted by a pin, 55. In the underside of the apron is a groove, 56, against the angular side, 57, of which the tool, 58, is adjustably secured by a set screw, 59, bearing against the flat, 60, on the one side of the tool. The two straight line cutting edges form substantially a V. An arm 61 secured to the outer end of shaft 51, has a flat guide bar, 62, secured to it, about half the width of which guide bar engages a grooved block 63, carried by its pivot, 64, in bearing, 65, mounted on the cross slide, 66, in dove-tail groove, 67. The groove in which the cross slide moves is in the upper side of the ram 49, and is rectangular to it. The horizontal plane in which the pivot 64 of the grooved block 63 moves is some distance above the shaft 51; therefore, if the cross slide is moved, the grooved block 63 carried by it will change the angular position of the arm 61, and thus turn the shaft 51, imparting to the shaper head, apron and tool a lateral swing. But if the motion of the cross slide is uniform, the velocity with which the shaft 51 turns will either be accelerated or retarded, according to as the grooved block 63 moves, either toward a point directly above the shaft 51 or away from that point.

The numeral 68 indicates a piece which is substantially a bell crank, for which the vertical stud 69 near the outer end of the ram is the fulcrum. The two radial slots 70 and 73 are at right angles to each other and engage the guide blocks 71 and 74, which are swiveled on the studs 72 and 75. The stud 72 is fastened to the end of the bed, and the stud 75 to the cross slide 66. The arm 76 attached to the bell crank is for operating the machine by hand. If the arm 76 is moved from right to left, the stud 72 being stationary, the fulcrum stud 69 and with it the ram 49 will move forward, while the cross slide 66 carried along with the ram and being further actuated by the same movement of the bell crank through the guide block 74 and the stud 75 will simultaneously slide in dovetail groove 67 and thus cause the shaper head with the tool to swing laterally, as already described.

Assuming the motion of the ram during its forward stroke to be uniform, the motion of the cross slide 66 carrying the pivoted grooved block 63 toward the point directly above the shaft 51 will also be uniform, but the velocity with which the shaper head 53 swings laterally will steadily increase and thus the straight cutting edge of the tool 58 will sweep out a surface with a variable twist, which is identical with the twisted tooth surface of the helicoidal rack.

This machine having to be operated by hand, the gear blank is preferably first stocked on some other machine, so that only little more than the essential part of the work, that is, the generating of the sides of the teeth, is left to be done. After the blank is put on the mandrel and tightened by the screw 14, the ram is moved forward until the tool is close to the blank. The index pin 22 is put through the middle of the three index holes 21 into one of the index holes 19 of the cone 18. Then the tangent screw which holds the index arm 20 to the mandrel is released, enabling the mandrel to be adjusted circumferentially until the rough cut spaces of the gear blank register sufficiently well with both sides of the tool, after which the tangent screw is tightened again. As only one side of the tooth can be finished at a time, some further adjustment is yet to be made. The division of the three index holes 21 differs from that of the index holes 19. By removing the index pin from the middle and putting it through one of the other two index holes 21, the gear blank is shifted circumferentially a fraction of its pitch and one side of the tooth brought in position for being finished. Before the actual cutting begins, the blank is swung far enough to one side to be clear of the path of the tool, which is done by operating the hand wheel 26. The arm 76 is then operated to and fro, imparting to the tool a reciprocating and simultaneously oscillating motion. At the same time, the gear blank is fed by turning the hand wheel 26, imparting to it a motion as if its pitch hyperboloid were rolling on the pitch surface of a helicoidal rack. As the gear blank thus gradually rolls into the path of the tool, successive cuts are made on somewhat converging lines, and after it has rolled nearly to the other end of the feed motion out of the path of the cutting tool,
a correctly curved tooth surface is generated. The gear blank is then rolled back to its former position, and indexed for the next tooth, and so on until all the teeth are finished on one side, after which the index pin is transferred from the index hole in the one side of index arm 20 to that of the other side, thereby shifting the gear blank circumferentially and bringing the opposite side of the tooth in position, which is then finished in the same manner. In order to obtain a very fine finish, the tool is then re-sharpened and the process repeated.

Fig. 11 shows the imaginary helicoidal rack on which my method of generating skew bevel gears is based. This rack which has some similarity to a winding stairway, winds around an axis represented by the vertical line A through the center. The dotted outline to the left represents the pitch hyperboloid of some skew bevel gear of which the line B in the middle between the curved sides is the axis. The curves C and C' represent hyperbolas to which the straight lines D and D' near them are the asymptotes. The angle which each asymptote forms with the axis of the hyperboloid is the asymptote angle. The dotted ellipses E and E' represent the same hyperboloid as seen after it is rolled around on the pitch surface of the helicoidal rack through an angle of 90 degrees. The smallest diameter of the hyperboloid is at the intersection F of the asymptotes. The circle which a section normal to the axis would reveal at that point and which in one of the views appears as an ellipse E' is known as the gorge circle. As this circle intersects the axis of the helicoidal rack, the distance at which this axis and that of the hyperboloid pass each other is equal to the gorge radius. It is in the nature of the helicoidal rack that there is a twist in its teeth and that this twist varies, it being quickest at the axis. Mathematically, the teeth of this rack extend beyond the axis as also does the hyperboloid extend beyond the point at which the asymptotes intersect, but for the purpose here it is sufficient to show only one branch of each.

Other modes of applying the principle of my invention may be employed for the mode herein explained. Change may therefore be made as regards the mechanism thus disclosed, provided the principles of construction set forth respectively in the following claims are employed.

Having thus described my invention, what I claim as new and desire to secure by Letters Patent, is:—

1. In a machine for cutting gears, means for holding a gear blank stationary, a cutting element, means for causing said element to travel across the part of the blank in which teeth are to be cut, and means for simultaneously oscillating the cutting edge of the cutter about an element in the face of the tooth on which the cutter acts.

2. A gear cutting machine comprising a cutting tool having a cutting edge, means for causing said tool to travel in a straight line, and means for simultaneously swinging the tool in the course of its travel about an axis which extends in the direction of its travel, the cutting edge of the tool being located to intersect such axis.

3. A machine for generating the teeth of skew bevel gears, comprising a holder for the gear blank, mechanism for rotating said holder and gear blank about the axis of the latter, mechanism for swinging said holder and gear blank about another axis askew to that of the gear blank, mechanism for moving said holder and gear blank along said other axis, connecting devices for operating the said three mechanisms simultaneously and thus imparting to the gear blank a motion as of its pitch hyperboloid rolling upon the pitch surface of an imaginary helicoidal rack, a cutting tool, mechanism for reciprocating and oscillating said cutting tool at the same time accelerating the lateral swinging of said cutting tool as it moves toward the gorge circle and retarding the said lateral swinging of the tool as it moves in the opposite direction, thereby causing the cutting edge of said cutting tool to sweep out a surface with a variable twist that coincides with the tooth surface of an imaginary helicoidal rack.

4. In a machine for cutting skew bevel gears, a suitable holder for the gear blank, feeding devices, a cutting tool, mechanism for reciprocating said tool, mechanism for oscillating said tool, and connecting devices between the said mechanisms for operating them simultaneously so that the cutting edge of said tool sweeps out a twisted surface.

5. In a machine for cutting skew bevel gears, a cutting tool, and actuating devices for simultaneously reciprocating and oscillating said tool so that the oscillation in relation to the reciprocation is accelerated during the time the stroke is in one direction, and retarded during the time the stroke is in the opposite direction, thereby imparting to said tool a motion such that its cutting edge sweeps out a twisted surface, the pitch of which is varying.

6. In a machine for cutting skew bevel gears, a cutting tool, means for operating said tool, a holder for a gear blank, mechanism for rotating said holder and gear blank about the axis of the latter, and mechanism for swinging said holder and gear blank about another axis askew to that of the gear blank, said other axis intersecting the gorge circle of the gear blank.

7. In a machine for cutting skew bevel gears, a cutting tool, means for operating said tool, a holder for the gear blank, mechanism for rotating said holder and gear blank about the axis of the latter, mechanism for swinging said holder and gear blank about another axis askew to that of said gear blank, and mechanism for moving said holder and gear blank in lines parallel to said other axis.

8. In a machine for cutting skew bevel gears, a holder for the blank, mechanism for rotating said holder and gear blank about the axis of the latter, mechanism for swinging said holder and gear blank about another axis askew to that of the gear blank, mechanism for moving said holder and gear blank in lines parallel to said other axis, and connecting devices between the said mechanisms, whereby all of them can be operated simultaneously producing the effect of the pitch hyperboloid of the gear blank rolling upon a helicoid.

9. In a machine for cutting skew bevel gears, a suitable holder for the gear blank, actuating devices for imparting to the gear blank a motion as if its pitch hyperboloid were rolling upon an imaginary helicoid, a cutting tool, and actuating devices for imparting to said tool a motion so that its cutting edge sweeps out a twisted surface.

10. In a machine for cutting skew bevel gears, a suitable holder for the gear blank, actuating devices for rolling the pitch hyperboloid of said gear blank as if on an imaginary helicoid, and a cutting tool the cutting edge of which sweeps out a twisted surface and the axis of which twisted surface is askew to the axis of the gear blank.

11. In a machine of the character stated, a cutting tool, means for rectilinearly reciprocating said tool, means for oscillating such tool in a plane transverse to said line of reciprocation, a shaft supported to rock with its axis in a plane parallel but out of alinement with the line of reciprocation of said tool and inclined away from the same, means for simultaneously rotating and longitudinally moving said shaft, an arbor for supporting the blank to be cut and supported at the upper end of said shaft eccentrically to the same and at an angle to the line of reciprocation of the tool, and means for rocking said shaft and rotating said arbor simultaneously.

12. In a machine of the character stated, a cutting tool, means for rectilinearly reciprocating said tool, means for oscillating such tool in a plane transverse to said line of reciprocation, a bearing in a plane parallel and out of alinement with said line of reciprocation and inclined away from said tool and having a steep female screw-thread at its lower end, a shaft in said bearing and formed with a thread engaging said female screw-thread, means for oscillating said shaft, a bearing supported upon the end of said shaft with its axis in a plane eccentric to the axis of the latter and inclined away from the tool, a mandrel in said bearing and provided at its end with means for supporting the blank to be cut, and means connected to the inclined shaft and to said arbor to simultaneously oscillate the same.

13. In a machine of the character stated, a tool, means for operating said tool, a holder for the gear blank, mechanism for rotating said holder and gear blank about the axis of the latter, mechanism for swinging said holder and gear blank in a helicoidal path, connecting devices between the said mechanisms whereby they can be operated simultaneously, and whereby the one mechanism for rotating the holder and gear blank can also be operated independently of the other mechanism.

14. In a machine of the character stated, a tool, means for operating said tool, a holder for the gear blank, mechanism for rotating said gear blank, mechanism for feeding said gear blank in a helicoidal path, connecting devices between the said mechanisms whereby they can be operated either simultaneously or independently of each other.

15. In a machine for cutting skew bevel gears, a tool, means for operating said tool, a holder for the gear blank, means for rotating said gear blank, means for feeding said gear blank in a helix, the axis of which is askew to that of the gear blank.

RICHARD MAX UHLMANN.

Witnesses:
WM. SECHER,
C. D. McVAY.